US009850333B2

(12) United States Patent
Jang et al.

(10) Patent No.: US 9,850,333 B2
(45) Date of Patent: *Dec. 26, 2017

(54) COPOLYMERS AND THERMOPLASTIC RESIN COMPOSITION INCLUDING THE SAME

(71) Applicant: Lotte Advanced Materials Co., Ltd., Yeosu-si (KR)

(72) Inventors: Joo Hyun Jang, Uiwang-si (KR); Jae Won Heo, Uiwang-si (KR); Il Jin Kim, Uiwang-si (KR); Kwang Soo Park, Uiwang-si (KR); Natarajan Senthilkumar, Uiwang-si (KR); Tae Gon Kang, Uiwang-si (KR); Bo Eun Kim, Uiwang-si (KR); Jun Sung Oh, Uiwang-si (KR)

(73) Assignee: Lotte Advanced Materials Co., Ltd., Yeosu-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/749,861

(22) Filed: Jun. 25, 2015

(65) Prior Publication Data

US 2015/0376315 A1 Dec. 31, 2015

(30) Foreign Application Priority Data

Jun. 27, 2014 (KR) .................. 10-2014-0079488
Oct. 15, 2014 (KR) .................. 10-2014-0139128

(51) Int. Cl.
C08L 25/12 (2006.01)
C08F 212/10 (2006.01)

(52) U.S. Cl.
CPC ............ C08F 212/10 (2013.01); C08L 25/12 (2013.01); C08L 2205/025 (2013.01); C08L 2205/03 (2013.01); C08L 2207/53 (2013.01)

(58) Field of Classification Search
CPC .... C08F 275/00; C08F 212/10; C08F 212/36; C08F 212/34; C08F 230/08; C08L 2205/025

See application file for complete search history.

(56) References Cited

U.S. PATENT DOCUMENTS

| | | | |
|---|---|---|---|
| 3,322,853 A | 5/1967 | Trementozzi et al. | |
| 3,742,092 A | 6/1973 | Duke et al. | |
| 3,839,513 A | 10/1974 | Patel | |
| 3,898,300 A | 8/1975 | Hilliard | |
| 4,027,073 A | 5/1977 | Clark | |
| 4,045,514 A | 8/1977 | Iwahashi et al. | |
| 4,062,909 A | 12/1977 | Morgan et al. | |
| 4,102,853 A | 7/1978 | Kawamura et al. | |
| 4,117,041 A | 9/1978 | Guschl | |
| 4,287,315 A | 9/1981 | Meyer et al. | |
| 4,303,772 A | 12/1981 | Novicky | |
| 4,391,935 A | 7/1983 | Bialous et al. | |
| 4,400,333 A | 8/1983 | Neefe | |
| 4,460,742 A | 7/1984 | Kishida et al. | |
| 4,466,912 A | 8/1984 | Phillips et al. | |
| 4,632,946 A | 12/1986 | Muench et al. | |
| 4,634,734 A | 1/1987 | Hambrecht et al. | |
| 4,652,614 A | 3/1987 | Eichenauer et al. | |
| 4,659,790 A | 4/1987 | Shimozato et al. | |
| 4,668,737 A | 5/1987 | Eichenauer et al. | |
| 4,692,488 A | 9/1987 | Kress et al. | |
| 4,745,029 A | 5/1988 | Kambour | |
| 4,757,109 A | 7/1988 | Kishida et al. | |
| 4,883,835 A | 11/1989 | Buysch et al. | |
| 4,906,696 A | 3/1990 | Fischer et al. | |
| 4,914,144 A | 4/1990 | Muehlbach et al. | |
| 4,918,159 A | 4/1990 | Nakamura et al. | |
| 4,983,658 A | 1/1991 | Kress et al. | |
| 4,988,748 A | 1/1991 | Fuhr et al. | |
| 4,997,883 A | 3/1991 | Fischer et al. | |
| 5,025,066 A * | 6/1991 | DeRudder ............. | C08L 51/085 525/100 |
| 5,061,558 A | 10/1991 | Fischer et al. | |
| 5,061,745 A | 10/1991 | Wittmann et al. | |
| 5,091,470 A | 2/1992 | Wolsink et al. | |
| 5,200,492 A | 4/1993 | Ohnaga et al. | |
| 5,204,394 A | 4/1993 | Gosens et al. | |
| 5,206,404 A | 4/1993 | Gunkel et al. | |
| 5,218,030 A | 6/1993 | Katayose et al. | |
| 5,219,907 A | 6/1993 | Niessner et al. | |
| 5,229,443 A | 7/1993 | Wroczynski | |
| 5,237,004 A | 8/1993 | Wu et al. | |
| 5,239,001 A | 8/1993 | Fischer et al. | |

(Continued)

FOREIGN PATENT DOCUMENTS

| | | |
|---|---|---|
| CA | 1 121 535 | 4/1982 |
| CN | 1377913 A | 11/2002 |

(Continued)

OTHER PUBLICATIONS

Paris et al. Journal of Polymer Science Part A 2007.*
Wunderlich thermal Analysis of Polymeric Materials 2005.*
Search Report in commonly owned European Patent Application No. EP 01 27 4302 dated Mar. 4, 2005, pp. 1-4.
Office Action in commonly owned U.S. Appl. No. 11/768,592 mailed Apr. 8, 2009, pp. 1-9.
Notice of Allowance in commonly owned U.S. Appl. No. 11/647,101 mailed Dec. 29, 2008, pp. 1-7.
International Search Report in commonly owned International Application No. PCT/KR2006/005752, dated Mar. 27, 2007, pp. 1-2.
International Search Report dated Jul. 14, 2005 in commonly owned international publication No. PCT/KR2004/003457, pp. 1.
International Preliminary Report on Patentability dated Jan. 25, 2007 in commonly owned international publication No. PCT/KR2004/003457, pp. 1-23.
Office Action in commonly owned U.S. Appl. No. 12/961,877 mailed Jul. 30, 2012, pp. 1-14.

(Continued)

*Primary Examiner* — Mark Kaucher
(74) *Attorney, Agent, or Firm* — Additon, Higgins & Pendleton, P.A.

(57) ABSTRACT

A copolymer capable of realizing a synergistic effect of matting characteristics and heat resistance properties includes two or more types of compounds including at least two unsaturated reactive groups. A thermoplastic resin composition including the copolymer is also provided.

17 Claims, 1 Drawing Sheet

(56) References Cited

U.S. PATENT DOCUMENTS

| | | |
|---|---|---|
| 5,274,031 A | 12/1993 | Eichenauer et al. |
| 5,280,070 A | 1/1994 | Drzewinski |
| 5,284,916 A | 2/1994 | Drzewinski |
| 5,292,809 A | 3/1994 | Drzewinski |
| 5,306,778 A | 4/1994 | Ishida et al. |
| 5,354,796 A | 10/1994 | Creecy et al. |
| 5,412,036 A | 5/1995 | Traugott et al. |
| 5,446,103 A | 8/1995 | Traugott et al. |
| 5,449,557 A | 9/1995 | Liebler et al. |
| 5,451,650 A | 9/1995 | Siol et al. |
| 5,473,019 A | 12/1995 | Siol et al. |
| 5,475,053 A | 12/1995 | Niessner et al. |
| 5,574,099 A | 11/1996 | Noro et al. |
| 5,605,962 A | 2/1997 | Suzuki et al. |
| 5,627,228 A | 5/1997 | Kobayashi |
| 5,635,565 A | 6/1997 | Miyajima et al. |
| 5,643,981 A | 7/1997 | Yang et al. |
| 5,672,645 A | 9/1997 | Eckel et al. |
| 5,731,390 A | 3/1998 | van Helmond |
| 5,750,602 A | 5/1998 | Kohler et al. |
| 5,833,886 A | 11/1998 | Dashevsky et al. |
| 5,905,122 A | 5/1999 | Ohtsuka et al. |
| 5,955,184 A | 9/1999 | Honda et al. |
| 6,022,917 A | 2/2000 | Kobayashi |
| 6,063,889 A | 5/2000 | Friebe et al. |
| 6,083,428 A | 7/2000 | Ueda et al. |
| 6,111,024 A | 8/2000 | McKee et al. |
| 6,127,465 A | 10/2000 | Nodera |
| 6,174,945 B1 | 1/2001 | Kim et al. |
| 6,252,002 B1 | 6/2001 | Yamada et al. |
| 6,337,371 B2 | 1/2002 | Kurata et al. |
| 6,369,141 B2 | 4/2002 | Ishii et al. |
| 6,380,304 B1 | 4/2002 | Vanspeybroeck et al. |
| 6,423,767 B1 | 7/2002 | Weber et al. |
| 6,437,029 B1 | 8/2002 | Lim et al. |
| 6,528,559 B1 | 3/2003 | Nakacho et al. |
| 6,528,561 B1 | 3/2003 | Zobel et al. |
| 6,566,428 B1 | 5/2003 | Ecket et al. |
| 6,576,161 B2 | 6/2003 | Lim et al. |
| 6,595,825 B1 | 7/2003 | De Wilde |
| 6,596,794 B1 | 7/2003 | Ecket et al. |
| 6,596,893 B2 | 7/2003 | Nakacho et al. |
| 6,613,822 B1 | 9/2003 | Eckel et al. |
| 6,613,824 B2 | 9/2003 | Campbell et al. |
| 6,630,524 B1 | 10/2003 | Lim et al. |
| 6,646,068 B2 | 11/2003 | Chisholm et al. |
| 6,686,404 B1 | 2/2004 | Eckel et al. |
| 6,716,900 B2 | 4/2004 | Jang et al. |
| 6,762,228 B2 | 7/2004 | Seidel et al. |
| 6,849,689 B2 | 2/2005 | Yamada et al. |
| 6,890,979 B2 | 5/2005 | Eichenauer et al. |
| 6,914,089 B2 | 7/2005 | Eckel et al. |
| 6,956,072 B1 | 10/2005 | Kanaka et al. |
| 7,001,944 B2 | 2/2006 | Vathauer et al. |
| 7,067,188 B1 | 6/2006 | Yang et al. |
| 7,094,818 B2 | 8/2006 | Lim et al. |
| 7,294,659 B2 | 11/2007 | Yatake |
| 7,511,088 B2 | 3/2009 | Lim et al. |
| 7,550,523 B2 | 6/2009 | Lim et al. |
| 7,659,332 B2 | 2/2010 | Kang et al. |
| 7,732,515 B2 | 6/2010 | Jang et al. |
| 7,767,738 B2 | 8/2010 | Gaggar et al. |
| 7,956,127 B2 | 6/2011 | Lee et al. |
| 8,119,726 B2 | 2/2012 | Lim et al. |
| 8,304,494 B2 | 11/2012 | Park et al. |
| 8,557,912 B2 | 10/2013 | Chung et al. |
| 8,735,490 B2 | 5/2014 | Chung et al. |
| 9,090,767 B2 | 7/2015 | Park et al. |
| 9,365,671 B2 | 6/2016 | Kim et al. |
| 2001/0009946 A1 | 7/2001 | Catsman et al. |
| 2002/0042483 A1 | 4/2002 | Vanderbilt |
| 2002/0115759 A1 | 8/2002 | Eckel et al. |
| 2002/0115794 A1* | 8/2002 | Singh .................. C08J 3/005 525/191 |
| 2002/0151624 A1 | 10/2002 | Kobayashi |
| 2003/0139504 A1 | 7/2003 | Miebach et al. |
| 2004/0013882 A1 | 1/2004 | Gorny et al. |
| 2004/0097648 A1* | 5/2004 | Nakai .................. C08F 265/04 525/63 |
| 2004/0122139 A1 | 6/2004 | Yang et al. |
| 2004/0192814 A1 | 9/2004 | Yang et al. |
| 2004/0198877 A1 | 10/2004 | Yang et al. |
| 2004/0249027 A1 | 12/2004 | Lim et al. |
| 2004/0249070 A1 | 12/2004 | Lim et al. |
| 2005/0159533 A1 | 7/2005 | Nabeshima et al. |
| 2005/0245648 A1 | 11/2005 | Lim et al. |
| 2005/0253277 A1* | 11/2005 | Yamanaka ............... B32B 7/06 257/778 |
| 2006/0004154 A1 | 1/2006 | DeRudder et al. |
| 2006/0014863 A1 | 1/2006 | Lim et al. |
| 2006/0030647 A1 | 2/2006 | Ebeling et al. |
| 2006/0074148 A1* | 4/2006 | Ahn .................. C08F 257/02 523/201 |
| 2006/0100307 A1 | 5/2006 | Uerz et al. |
| 2007/0055017 A1 | 3/2007 | Schultes et al. |
| 2007/0100073 A1* | 5/2007 | Lee .................. C08F 257/02 525/100 |
| 2007/0155873 A1 | 7/2007 | Kang et al. |
| 2007/0249767 A1 | 10/2007 | Kang et al. |
| 2007/0249768 A1 | 10/2007 | Hong et al. |
| 2007/0287799 A1 | 12/2007 | Ha et al. |
| 2007/0295946 A1 | 12/2007 | Lim et al. |
| 2008/0182926 A1 | 7/2008 | Lim et al. |
| 2009/0054568 A1 | 2/2009 | Uejima et al. |
| 2009/0080079 A1 | 3/2009 | Kogure et al. |
| 2009/0093583 A1 | 4/2009 | Kawato et al. |
| 2009/0118402 A1 | 5/2009 | Jang et al. |
| 2010/0029855 A1 | 2/2010 | Matsuoka et al. |
| 2010/0152357 A1 | 6/2010 | Kwon et al. |
| 2010/0168272 A1 | 7/2010 | Park et al. |
| 2010/0168315 A1 | 7/2010 | Park et al. |
| 2010/0168354 A1* | 7/2010 | Hong .................. C08F 279/02 526/213 |
| 2010/0240831 A1 | 9/2010 | Kim et al. |
| 2010/0256288 A1 | 10/2010 | Kim et al. |
| 2011/0003918 A1 | 1/2011 | Eckel et al. |
| 2011/0009524 A1 | 1/2011 | Kwon et al. |
| 2011/0021677 A1 | 1/2011 | Kwon et al. |
| 2011/0040019 A1 | 2/2011 | Kwon et al. |
| 2011/0157866 A1 | 6/2011 | Li et al. |
| 2011/0159293 A1 | 6/2011 | Park et al. |
| 2011/0160377 A1* | 6/2011 | Chung .................. C08L 25/12 524/504 |
| 2011/0160380 A1 | 6/2011 | Kwon et al. |
| 2011/0230610 A1 | 9/2011 | Schultes et al. |
| 2012/0016068 A1 | 1/2012 | Chung et al. |
| 2013/0328149 A1 | 12/2013 | Okaniwa et al. |
| 2014/0187717 A1 | 7/2014 | Kwon et al. |
| 2014/0275366 A1 | 9/2014 | Chrino et al. |
| 2015/0152205 A1* | 6/2015 | Kim .................. C08F 212/10 526/279 |
| 2015/0216787 A1 | 8/2015 | Hori et al. |
| 2015/0376386 A1 | 12/2015 | Kim et al. |
| 2015/0376392 A1 | 12/2015 | Kim et al. |
| 2015/0376402 A1 | 12/2015 | Kim et al. |
| 2015/0376403 A1 | 12/2015 | Kwon et al. |
| 2016/0137837 A1 | 5/2016 | Kwon et al. |

FOREIGN PATENT DOCUMENTS

| | | |
|---|---|---|
| CN | 101061179 A | 10/2007 |
| CN | 101768331 A | 7/2010 |
| CN | 102115564 A | 7/2011 |
| CN | 102153848 A | 8/2011 |
| CN | 102329462 A | 1/2012 |
| CN | 102974324 A | 3/2013 |
| CN | 104072659 A | 10/2014 |
| DE | 19614845 A1 | 10/1997 |
| DE | 196 32 675 A1 | 2/1998 |
| DE | 19801198 A1 | 7/1999 |
| DE | 10061081 A1 | 6/2002 |
| EP | 0107015 A1 | 5/1984 |
| EP | 0149813 | 7/1985 |

(56) References Cited

FOREIGN PATENT DOCUMENTS

| | | |
|---|---|---|
| EP | 0370344 A2 | 5/1990 |
| EP | 0 449 689 A1 | 10/1991 |
| EP | 0483717 A2 | 5/1992 |
| EP | 0 612 806 A1 | 8/1994 |
| EP | 0640655 A3 | 3/1995 |
| EP | 0 661 342 A1 | 7/1995 |
| EP | 0 700 968 A1 | 3/1996 |
| EP | 0721962 A2 | 7/1996 |
| EP | 0 728 811 A2 | 8/1996 |
| EP | 0 767 204 A2 | 4/1997 |
| EP | 0771852 A2 | 5/1997 |
| EP | 0 795 570 A1 | 9/1997 |
| EP | 0909790 A1 | 4/1999 |
| EP | 0 970 997 A2 | 1/2000 |
| EP | 1010725 A2 | 6/2000 |
| EP | 1 069 156 A1 | 1/2001 |
| EP | 1069154 A | 1/2001 |
| EP | 1117742 | 7/2001 |
| EP | 1209163 A1 | 5/2002 |
| EP | 2204412 A1 | 7/2010 |
| GB | 1042783 A1 | 9/1966 |
| JP | 59-149912 A | 8/1984 |
| JP | 59-202240 | 11/1984 |
| JP | 04-023856 A | 1/1992 |
| JP | 04-359954 A | 12/1992 |
| JP | 61 00785 | 1/1994 |
| JP | 06-100785 | 4/1994 |
| JP | 06-313089 A | 11/1994 |
| JP | 7-76649 | 3/1995 |
| JP | 08-012868 A | 1/1996 |
| JP | 8-208884 | 8/1996 |
| JP | 08-239544 A | 9/1996 |
| JP | 09-053009 A | 2/1997 |
| JP | 10-017762 A | 1/1998 |
| JP | 2000-154277 A1 | 6/2000 |
| JP | 2001-049072 A | 2/2001 |
| JP | 2001-226576 A | 8/2001 |
| JP | 2001-316580 A | 11/2001 |
| JP | 2002-080676 A | 3/2002 |
| JP | 2002-348457 A | 12/2002 |
| JP | 2005-247999 A | 9/2005 |
| JP | 2006-131833 A | 5/2006 |
| JP | 2006-249288 A | 9/2006 |
| JP | 2006-249292 A | 9/2006 |
| JP | 2006-257126 A | 9/2006 |
| JP | 2006-257284 A | 9/2006 |
| JP | 2006-342246 A | 12/2006 |
| JP | 2007-023227 | 2/2007 |
| JP | 2008-292853 A1 | 12/2008 |
| JP | 2014-040512 A | 3/2014 |
| KR | 1994-0014647 | 7/1994 |
| KR | 1996-14253 A | 5/1996 |
| KR | 1999-33150 A | 5/1999 |
| KR | 1999-47019 A1 | 7/1999 |
| KR | 2000 41992 A1 | 1/2000 |
| KR | 1020000009218 A | 2/2000 |
| KR | 10-2000-0048033 A | 7/2000 |
| KR | 1020000041993 A | 7/2000 |
| KR | 10-2000-0055347 A | 9/2000 |
| KR | 2001 109044 A1 | 12/2001 |
| KR | 2002 6350 A1 | 1/2002 |
| KR | 100360710 B | 10/2002 |
| KR | 2002 83711 A1 | 11/2002 |
| KR | 2001 107423 A1 | 12/2002 |
| KR | 1020020094345 A | 12/2002 |
| KR | 10-2003-0020584 A | 3/2003 |
| KR | 10-2003-0055443 A | 7/2003 |
| KR | 2003-0095537 A | 12/2003 |
| KR | 10-2004-0007788 A | 1/2004 |
| KR | 1020040058809 A | 7/2004 |
| KR | 2004-079118 A | 9/2004 |
| KR | 10-2006-0109470 A | 10/2006 |
| KR | 648114 B1 | 11/2006 |
| KR | 10-0666797 B1 | 1/2007 |
| KR | 10-0767428 B1 | 10/2007 |
| KR | 885819 B1 | 12/2007 |
| KR | 10-2008-0036790 A | 4/2008 |
| KR | 2009-0029539 A | 3/2009 |
| KR | 10-902352 | 6/2009 |
| KR | 10-2011-0079489 A | 7/2011 |
| KR | 10-2012-006839 A | 1/2012 |
| KR | 10-2012-0042026 A | 5/2012 |
| KR | 10-2012-0078417 A | 7/2012 |
| KR | 10-2013-0076616 A | 7/2013 |
| KR | 10-2013-0078747 | 7/2013 |
| WO | 99 19383 A1 | 4/1999 |
| WO | 99/57198 A1 | 11/1999 |
| WO | 00/6648 A1 | 2/2000 |
| WO | 00/18844 A1 | 4/2000 |
| WO | 00 00544 A1 | 1/2001 |
| WO | 01/66634 A | 9/2001 |
| WO | 00 09518 A1 | 2/2002 |
| WO | 02 46287 A1 | 6/2002 |
| WO | 03/020827 A1 | 3/2003 |
| WO | 03/022928 A1 | 3/2003 |
| WO | 03/042303 A1 | 5/2003 |
| WO | 03/042305 A1 | 5/2003 |
| WO | 2004/007611 A1 | 1/2004 |
| WO | 2006 041237 A1 | 4/2006 |
| WO | 2007/004434 | 1/2007 |
| WO | 2007/119920 A1 | 10/2007 |
| WO | 2007/140101 A1 | 12/2007 |
| WO | 2008/081791 A1 | 7/2008 |
| WO | 2009/078593 A1 | 6/2009 |
| WO | 2009/078602 A1 | 6/2009 |
| WO | 2009/113762 A2 | 9/2009 |
| WO | 2009/116722 A1 | 9/2009 |
| WO | 2009/128601 A | 10/2009 |

OTHER PUBLICATIONS

European Search Report in commonly owned European Application No. 14194463.7 dated Apr. 23, 2015, pp. 1-2.
European Search Report in commonly owned European Application No. 08862371 dated Dec. 7, 2010, pp. 1-6.
International Search Report in commonly owned International Application No. PCT/KR2008/006870, dated May 28, 2009, pp. 1-2.
Office Action in commonly owned U.S. Appl. No. 12/631,018 mailed Nov. 8, 2011, pp. 1-10.
Chinese Office Action in commonly owned Chinese Application No. 200910211954 dated Jun. 23, 2011, pp. 1-5.
English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).
Office Action in commonly owned U.S. Appl. No. 12/642,904 mailed Dec. 14, 2011, pp. 1-9.
European Search Report in commonly owned European Application No. 09180634 dated Feb. 2, 2010, pp. 1-3.
Xu, "Predicition of Refractive Indices of Linear Polymers by a four-descriptor QSPR model", Polymer, 45 (2004) pp. 8651-8659.
European Search Report in commonly owned European Application No. 10196806 dated Apr. 27, 2011, pp. 1-5.
Japanese Office Action in commonly owned Japanese Application No. 2010-539284, dated Sep. 11, 2012, pp. 1-3.
Office Action in commonly owned U.S. Appl. No. 12/631,018 mailed Apr. 26, 2012, pp. 1-12.
Office Action in commonly owned U.S. Appl. No. 12/642,904 mailed Mar. 27, 2012, pp. 1-7.
Notice of Allowance in commonly owned U.S. Appl. No. 12/642,904 mailed Jul. 2, 2012, pp. 1-8.
Office Action in commonly owned U.S. Appl. No. 12/817,302 mailed Mar. 29, 2012, pp. 1-5.
Office Action in commonly owned U.S. Appl. No. 12/884,549 mailed Aug. 21, 2012, pp. 1-12.
Mark, Physical Properties of Polymers Handbook, 2nd Edition, Polymer Research Center and Department of Chemistry, University of Cincinnati, OH, (2007) Springer, pp. 5-7.

(56) References Cited

OTHER PUBLICATIONS

Polysciences, Inc., data sheet for benzyl acrylate, no date, pp. 1-2.
Guidechem, data sheet for RUBA-93, no date, pp. 1-2.
European Search Report in commonly owned European Application No. 08873329.0 dated Dec. 14, 2012, pp. 1-7.
Office Action in commonly owned Application U.S. Appl. No. 12/972,795 mailed Jan. 18, 2013, pp. 1-9.
International Search Report in commonly owned International Application No. PCT/KR2008/07825 dated Aug. 28, 2009, pp. 1-2.
Machine translation of JP 2006-257284, pp. 1-27, Date: 2006.
Office Action in commonly owned U.S. Appl. No. 12/880,209 mailed Feb. 16, 2011, pp. 1-10.
International Search Report in commonly owned International Application No. PCT/KR2008/07820 dated Jul. 28, 2009, pp. 1-2.
Final Office Action in commonly owned U.S. Appl. No. 12/880,209 mailed Jul. 29, 2011, pp. 1-9.
Advisory Action in commonly owned U.S. Appl. No. 12/880,209 mailed Nov. 4, 2011, pp. 1-4.
International Search Report in commonly owned International Application No. PCT/KR2008/007157, dated May 28, 2009.
Final Office Action in commonly owned U.S. Appl. No. 12/792,176 mailed Apr. 19, 2012, pp. 1-10.
Advisory Action in commonly owned U.S. Appl. No. 12/792,176 mailed Aug. 23, 2012, pp. 1-4.
European Search Report in commonly owned European Application No. 08873425.6 dated May 29, 2012, pp. 1-5.
Office Action in commonly owned U.S. Appl. No. 12/792,176 mailed Nov. 16, 2011, pp. 1-12.
Notice of Allowance in commonly owned U.S. Appl. No. 12/880,209 mailed Oct. 10, 2013, pp. 1-10.
European Search Report for commonly owned European Application No. EP 04808586, completed on Sep. 25, 2007.
Chinese Office Action in commonly owned Chinese Application No. 200880128614.0 dated Mar. 7, 2012, pp. 1-5.
English-translation of Chinese Office Action in commonly owned Chinese Application No. 200880128614.0 dated Mar. 7, 2012, pp. 1-2.
Advisory Action in commonly owned U.S. Appl. No. 12/631,018 mailed Nov. 7, 2012, pp. 1-3.
Final Office Action in commonly owned U.S. Appl. No. 12/817,302 mailed Feb. 7, 2013, pp. 1-6.
Final Office Action in commonly owned U.S. Appl. No. 12/884,549 mailed Dec. 18, 2012, pp. 1-7.
Notice of Allowance in commonly owned U.S. Appl. No. 12/884,549 mailed Apr. 11, 2013, pp. 1-8.
European Search Report in commonly owned European Application No. 07024808, dated Mar. 18, 2008, pp. 1-2.
Machine Translation of JP 10-017762, Date: 2011.
Derwent Abstract of JP 2002348457 (A) (2003).
Full English Translation of JP-10-017762 (2011).
Advisory Action in commonly owned U.S. Appl. No. 12/817,302 mailed May 16, 2013, pp. 1-5.
Office Action in commonly owned Application U.S. Appl. No. 12/898,012 mailed Dec. 21, 2012, pp. 1-6.
Notice of Allowance in commonly owned U.S. Appl. No. 12/972,795 mailed May 24, 2013, pp. 1-8.
Chinese Office Action in commonly owned Chinese Application No. 201010597679.9 dated Aug. 27, 2012, pp. 1-5.
European Search Report in commonly owned European Application No. 10194938.6 dated Jul. 21, 2011, pp. 1-5.
Notice of Allowance in commonly owned U.S. Appl. No. 12/961,877 mailed Jun. 19, 2013, pp. 1-10.
Final Office Action in commonly owned U.S. Appl. No. 12/961,877 mailed Nov. 28, 2012, pp. 1-10.
Advisory Action in commonly owned U.S. Appl. No. 12/961,877 mailed Mar. 12, 2013, pp. 1-2.
Silicones: An Introduction to Their Chemistry and Application, The Plastics Institute 1962, p. 27.
Extended European Search Report in commonly owned European Application No. 09180865.9, dated Apr. 16, 2010.
Office Action in commonly owned U.S. Appl. No. 14/747,207, dated Aug. 2, 2016, pp. 1-17.
Office Action in commonly owned Chinese Application No. 201510792588.3 dated Mar. 10, 2017, pp. 1-7.
Advisory Action in commonly owned U.S. Appl. No. 14/747,207 dated Mar. 15, 2017, pp. 1-4.
Search Report in commonly owned Chinese Application No. 201310737841.6 dated Apr. 22, 2015, pp. 1-2.
Baek et al., electronic translation of KR 10-666797, Jan. 2007, pp. 1-6.
Non-Final Office Action in commonly owned U.S. Appl. No. 14/097,538 dated Mar. 26, 2015, pp. 1-11.
Non-Final Office Action in commonly owned U.S. Appl. No. 14/097,538 dated Aug. 11, 2015, pp. 1-6.
Final Office Action in commonly owned U.S. Appl. No. 14/097,538 dated Nov. 23, 2015, pp. 1-7.
Notice of Allowance in commonly owned U.S. Appl. No. 14/097,538 dated Mar. 30, 2016, pp. 1-9.
Extended Search Report in commonly owned European Application No. 15194797.5 dated Mar. 18, 2016, pp. 1-7.
Non-Final Office Action in commonly owned U.S. Appl. No. 14/749,861 dated Nov. 20, 2015, pp. 1-17.
Final Office Action in commonly owned U.S. Appl. No. 14/747,207 dated Dec. 5, 2016, pp. 1-8.
Non-Final Office Action in commonly owned U.S. Appl. No. 14/750,364 dated Jun. 16, 2016, pp. 1-7.
Notice of Allowance in commonly owned U.S. Appl. No. 14/750,364 dated Oct. 6, 2016, pp. 1-8.
Non-Final Office Action in commonly owned U.S. Appl. No. 14/748,576 dated Feb. 16, 2016, pp. 1-9.
Notice of Allowance in commonly owned U.S. Appl. No. 14/748,576 dated Jun. 29, 2016, pp. 1-9.
Non-Final Office Action in commonly owned U.S. Appl. No. 14/930,954 dated Oct. 18, 2016, pp. 1-13.
Office Action in counterpart Chinese Application No. 201510364557.8 dated Mar. 31, 2017, pp. 1-6.
Office Action in commonly owned Korean Application No. 10-2014-0140473 dated Oct. 19, 2016, pp. 1-5.
Office Action in commonly owned Korean Application No. 10-2014-0160794 dated Dec. 9, 2016, pp. 1-5.
Office Action in commonly owned U.S. Appl. No. 14/747,207 dated Jul. 25, 2017, pp. 1-9.
Office Action in counterpart Korean Application No. 10-2014-0139128 dated Sep. 23, 2016, pp. 1-6.
Office Action in commonly owned U.S. Appl. No. 14/557,478 dated Jun. 4, 2015, pp. 1-9.
Final Office Action in commonly owned U.S. Appl. No. 14/557,478 dated Oct. 30, 2015, pp. 1-6.
Notice of Allowance in commonly owned U.S. Appl. No. 14/557,478 dated Feb. 18, 2016, pp. 1-5.
Office Action in commonly owned U.S. Appl. No. 14/747,176 dated Apr. 11, 2016, pp. 1-8.
Final Office Action in commonly owned U.S. Appl. No. 14/747,176 dataed Jul. 27, 2016, pp. 1-6.
Notice of Allowance in commonly owned U.S. Appl. No. 14/747,176 dated Oct. 7, 2016, pp. 1-6.
Notice of Allowance in commonly owned U.S. Appl. No. 12/880,209 dated Oct. 10, 2013, pp. 1-11.
Office Action in commonly owned U.S. Appl. No. 12/792,176 dated Nov. 16, 2011, pp. 1-12.

\* cited by examiner

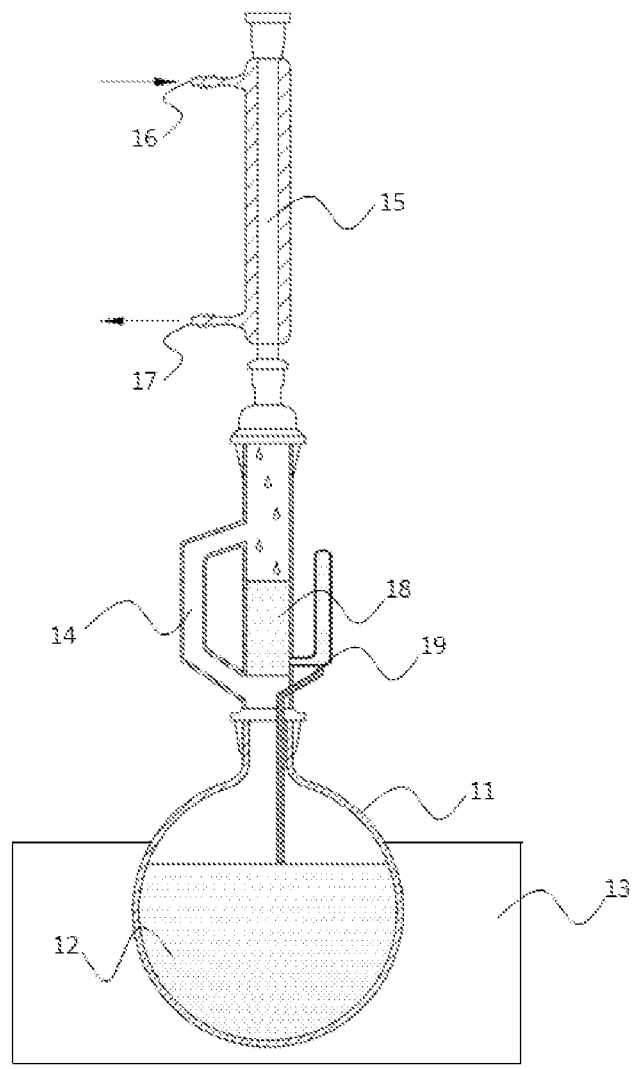

COPOLYMERS AND THERMOPLASTIC RESIN COMPOSITION INCLUDING THE SAME

CROSS-REFERENCE TO RELATED APPLICATION

This application claims priority under 35 USC Section 119 to and the benefit of Korean Patent Application No. 10-2014-0079488, filed on Jun. 27, 2014, and Korean Patent Application No. 10-2014-0139128, filed on Oct. 15, 2014, in the Korean Intellectual Property Office, the entire disclosure of each of which is incorporated herein by reference.

FIELD OF THE INVENTION

The present invention relates to a copolymer and a thermoplastic resin composition including the same.

BACKGROUND

Thermoplastic resins have lower specific gravity than glass or metals, and also have excellent mechanical properties such as moldability, impact resistance, and the like. Plastic products prepared using such thermoplastic resins have rapidly replaced glass and metals in various fields, including electric and electronic products, automobile parts, etc.

In recent years, there has been an increasing demand for products having a low-gloss appearance. Gloss-less paint has been applied to the surface of plastic products to provide a low gloss surface. There are, however, environmental concerns associated with the same. Accordingly, there has been an increased demand for low-gloss resins.

Conventionally, low-gloss resins have been prepared by using or modifying large-sized rubber particles. However, such a method can have problems, for example, the low-gloss effect can be poor, and impact strength and heat resistance can be degraded.

As another method, a method of graft-polymerizing a monomer such as ethylenically unsaturated carboxylic acid onto a resin to prepare a copolymer has been used. This copolymer can have various good physical properties, but heat resistance thereof can suddenly degrade.

U.S. Pat. No. 4,460,742 discloses a low-gloss resin composition in which a cross-linked copolymer is used. Such a resin composition can have a matte appearance when large-sized rubber particles or a matting agent is added. However, the resin composition can require an excessive amount of the matting agent, which can degrade impact strength and temperature resistance.

SUMMARY

Exemplary embodiments provide a copolymer of a mixture of monomers including (A) an aromatic vinyl-based monomer; (B) an unsaturated nitrile-based monomer; and (C) a cross-linkable monomer, wherein (C) the cross-linkable monomer comprises (c1) a first cross-linkable monomer including at least two unsaturated reactive groups, and (c2) a second cross-linkable monomer including at least two unsaturated reactive groups.

In exemplary embodiments, the first cross-linkable monomer (c1) may include a siloxane bond, and the second cross-linkable monomer (c2) may include no siloxane bonds.

The copolymer may include: about 50% by weight (wt %) to about 80 wt % of the aromatic vinyl-based monomer (A); about 15 wt % to about 40 wt % of the unsaturated nitrile-based monomer (B); and about 1 wt % to about 10 wt % of the cross-linkable monomer (C).

In exemplary embodiments, the first cross-linkable monomer (c1) is present in an amount of about 0.99 wt % to about 8 wt %, based on the total weight of a mixture of monomers to be copolymerized, and the second cross-linkable monomer (c2) is present in an amount of about 0.01 wt % to about 2 wt %, based on the total weight of a mixture of monomers to be copolymerized.

In exemplary embodiments, (c1) the first cross-linkable monomer and (c2) the second cross-linkable monomer may be included at a weight ratio of about 2:1 to about 70:1.

In exemplary embodiments, the first cross-linkable monomer (c1) may include a compound or a mixture of two or more compounds having a structure represented by the following Formula 1:

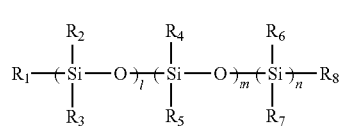

[Formula 1]

wherein in Formula 1, l, m and n are the same or different and are each independently an integer ranging from 0 to 100 (provided that l, m and n are not zero simultaneously), and $R_1$, $R_2$, $R_3$, $R_4$, $R_5$, $R_6$, $R_7$, and $R_8$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, provided that at least two of $R_1$ to $R_8$ include a polymerizable unsaturated reactive group.

In exemplary embodiments, the first cross-linkable monomer (c1) may have a ring-shaped structure and may include a compound or a mixture of two or more compounds having a structure represented by the following Formula 2:

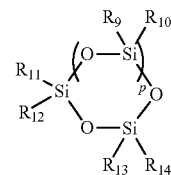

[Formula 2]

wherein in Formula 2, $R_9$ to $R_{14}$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, and p is an integer ranging from 1 to 6, provided that at least two of $R_9$ to $R_{14}$ include a polymerizable unsaturated reactive group.

In exemplary embodiments, the first cross-linkable monomer (c1) may include at least one selected from 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, and/or 1,3,5,7,9-pentaethyl-1,3,5,7,9-pentavinyl-cyclopentasiloxane.

In exemplary embodiments, the first cross-linkable monomer (c1) may have a weight average molecular weight of about 150 g/mol to about 6,000 g/mol.

In exemplary embodiments, the second cross-linkable monomer (c2) may include at least one selected from a cross-linkable aromatic monomer including divinylbenzene; a vinyl group-containing monomer including at least one selected from 1,4-divinyloxybutane and/or divinylsulfone; an allyl compound including at least one selected from diallylphthalate, diallylacrylamide, triallyl(iso)cyanurate, and/or triallyltrimellitate; and/or a (meth)acrylate compound including at least one selected from hexanediol diacrylate, ethylene glycol dimethacrylate, diethylene glycol methacrylate, triethylene glycol dimethacrylate, trimethylene propane trimethacrylate, 1,3-butanediol methacrylate, 1,6-hexanediol dimethacrylate, pentaerythritol tetra(meth)acrylate, pentaerythritol tri(meth)acrylate, pentaerythritol di(meth)acrylate, trimethylolpropane, tri(meth)acrylate, dipentaerythritol hexa(meth)acrylate, dipentaerythritol penta(meth)acrylate, glycerol tri(meth)acrylate, and/or allyl(meth)acrylate.

In exemplary embodiments, the aromatic vinyl-based monomer (A) may include at least one selected from styrene, α-methylstyrene, β-methylstyrene, p-methylstyrene, p-t-butylstyrene, ethylstyrene, vinylxylene, monochlorostyrene, dichlorostyrene, dibromostyrene, and/or vinylnaphthalene.

In exemplary embodiments, the unsaturated nitrile-based monomer (B) may include at least one selected from acrylonitrile, methacrylonitrile, ethacrylonitrile, phenylacrylonitrile, α-chloroacrylonitrile, and/or fumaronitrile.

In exemplary embodiments, the copolymer may have an insoluble content of about 5 wt % to about 100 wt %, as measured by a Soxhlet extraction method.

In exemplary embodiments, the copolymer may have a silicon content of about 0.33 wt % to about 2.61 wt %, as measured by an X-ray fluorescence (XRF) spectrometer.

In exemplary embodiments, the copolymer may have a glass transition temperature ($T_g$) of about 95° C. to about 115° C.

The present invention may provide a thermoplastic resin composition including the copolymer.

In exemplary embodiments, the thermoplastic resin composition may include styrene-acrylonitrile copolymer (SAN) resin composition, a methyl methacrylate-styrene-acrylonitrile copolymer (MSAN) resin composition, an acrylonitrile-butadiene-styrene copolymer (ABS) resin composition, a methyl methacrylate-acrylonitrile-butadiene-styrene copolymer (MABS) resin composition, an acrylonitrile-styrene-acrylate copolymer (ASA) resin composition, a polycarbonate (PC)/acrylonitrile-butadiene-styrene copolymer (ABS) alloy resin composition, a polycarbonate (PC)/acrylonitrile-styrene-acrylate copolymer (ASA) alloy resin composition, a polymethyl methacrylate (PMMA)/acrylonitrile-butadiene-styrene copolymer (ABS) alloy resin composition, a polymethyl methacrylate (PMMA)/methyl methacrylate-acrylonitrile-butadiene-styrene copolymer (MABS) alloy resin composition, and/or a polymethyl methacrylate (PMMA)/acrylonitrile-styrene-acrylate copolymer (ASA) alloy resin composition.

Also, the present invention may provide a molded article including the thermoplastic resin composition including the copolymer.

In exemplary embodiments, the molded article may have a gloss of about 50% or less, as measured at an angle of 60° by an evaluation method according to ASTM D523, and may have a Vicat softening temperature (VST) of about 101° C. to about 110° C., as measured for a ¼ inch-thick specimen under conditions of a load of 5 kg and a rate of 50° C./hr by an evaluation method according to ISO 306B50.

BRIEF DESCRIPTION OF DRAWINGS

FIG. 1 is a schematic view of a Soxhlet extraction reactor in accordance with one embodiment of the present invention.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Hereinafter, the configurations and functions of the present invention will be described in further detail with reference to exemplary embodiments. However, it should be understood that the detailed description provided herein is given by way of illustration only, and is not intended to limit the scope of the present invention in any way. Also, unless specifically stated otherwise, all the technical and scientific terms used in this specification have the same meanings as what are generally understood by a person skilled in the related art to which the present invention belongs. In the following description, detailed descriptions of well-known functions or constructions will be omitted since they would obscure the invention in unnecessary detail.

In the present invention, the weight average molecular weight (units: g/mol) of a powder sample is measured using gel permeation chromatography (GPC; Agilent Technologies 1200 series) after the sample is dissolved in tetrahydrofuran (THF). In this case, Shodex LF-804 (8.0.1.D.×300 mm) and polystyrene (Shodex Co. Ltd.) are used as a column and a standard sample, respectively.

The present inventors have conducted research on aromatic vinyl based copolymers capable of realizing a synergistic effect of uniform matting characteristics and heat resistance properties without degrading the various physical properties such as impact resistance, and surprisingly found that when an aromatic vinyl based copolymer is prepared from a mixture of monomers including two or more compounds including at least two unsaturated reactive groups in addition to an aromatic vinyl-based monomer and an unsaturated nitrile-based monomer, the aromatic vinyl based copolymer may exhibit improve uniform matting characteristics and heat resistance properties at the same time with minimal or no degradation of various physical properties. Therefore, the present invention has been completed based on these facts.

In exemplary embodiments, the copolymer is a copolymer of a mixture of monomers including (A) an aromatic vinyl-based monomer, (B) an unsaturated nitrile-based monomer, and (C) a cross-linkable monomer, wherein the cross-linkable monomer (C) includes (c1) a first cross-linkable monomer including at least two unsaturated reactive groups, and (c2) a second cross-linkable monomer including at least two unsaturated reactive groups.

Hereinafter, the respective components will be described in further detail.

(A) Aromatic Vinyl-Based Monomer

Examples of the aromatic vinyl-based monomer that may be used herein may include without limitation styrene, α-methylstyrene, β-methylstyrene, p-methylstyrene, p-t-butylstyrene, ethylstyrene, vinylxylene, monochlorostyrene, dichlorostyrene, dibromostyrene, and vinylnaphthalene. These monomers may be used alone or in combination.

In exemplary embodiments, the aromatic vinyl-based monomer may include styrene and/or α-methylstyrene.

In exemplary embodiments, the aromatic vinyl-based monomer may be present in an amount of about 50% by weight (wt %) to about 80 wt %, for example about 55 wt % to about 78 wt %, and as another example about 60 wt % to about 78 wt %, based on the total weight (100 wt %) of the mixture of monomers copolymerized to prepare the copolymer. In some embodiments, the aromatic vinyl-based monomer may be present in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments, the amount of the aromatic vinyl-based monomer can be in a range from about any of the foregoing amounts to about any other of the foregoing amounts.

When the amount of the aromatic vinyl-based monomer is within this range, impact strength and/or heat resistance of the thermoplastic resin composition may be improved.

(B) Unsaturated Nitrile-Based Monomer

Examples of the unsaturated nitrile-based monomer that may be used herein may include without limitation acrylonitrile, methacrylonitrile, ethacrylonitrile, phenylacrylonitrile, α-chloroacrylonitrile, and/or fumaronitrile. These monomers may be used alone or in combination.

In exemplary embodiments, the unsaturated nitrile-based monomer may include acrylonitrile.

In exemplary embodiments, the unsaturated nitrile-based monomer may be present in an amount of about 15 wt % to about 40 wt %, for example about 18 wt % to about 35 wt %, and as another example about 20 wt % to about 32 wt %, based on the total weight (100 wt %) of the mixture of monomers used to prepare the copolymer. In some embodiments, the unsaturated nitrile-based monomer may be present in an amount of about 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments, the amount of the unsaturated nitrile-based monomer can be in a range from about any of the foregoing amounts to about any other of the foregoing amounts.

Within this content range, matting characteristics of the thermoplastic resin composition may be improved with minimal or no degradation of mechanical properties and/or molding processability.

In exemplary embodiments, the mixture of monomers can include a weight ratio of the aromatic vinyl-based monomer to the unsaturated nitrile-based monomer (aromatic vinyl-based monomer:unsaturated nitrile-based monomer) in a range of about 7:3 to about 9:1, for example about 6:4 to about 8:2. When this weight ratio range is satisfied, the unsaturated nitrile-based monomer may be combined with other components to improve matting characteristics with minimal or no degradation of mechanical properties and/or molding processability of the thermoplastic resin composition.

(C) Cross-Linkable Monomer

In exemplary embodiments, when two or more cross-linkable monomers are included, uniform matting characteristics and/or heat resistance may be realized at the same time. According to exemplary embodiments, the cross-linkable monomer (C) includes (c1) a first cross-linkable monomer including at least two unsaturated reactive groups, and (c2) a second cross-linkable monomer including at least two unsaturated reactive groups (which is not the same the first cross-linkable monomer (c1)).

In exemplary embodiments, the cross-linkable monomer (C) may be present in an amount of about 1 wt % to about 10 wt %, for example, about 1 wt % to about 8 wt %, and as another example 1.5 wt % to about 5 wt %, based on the total weight (100 wt %) of the mixture of monomers used to prepare the copolymer. In some embodiments, the cross-linkable monomer (C) may be present in an amount of about 1, 1.5, 2, 2.5, 3, 3.5, 4, 4.5, 5, 5.5, 6, 6.5, 7, 7.5, 8, 8.5, 9, 9.5, or 10 wt %. Further, according to some embodiments, the amount of the cross-linkable monomer (C) can be in a range from about any of the foregoing amounts to about any other of the foregoing amounts.

When this content range is satisfied, a cross-linking degree of the copolymer may be easily controlled, heat resistance and matting characteristics may be improved with minimal or degradation of impact resistance, and/or uniform matting characteristics may be generally realized.

The cross-linkable monomer (C) may include the first cross-linkable monomer (c1) and the second cross-linkable monomer (c2) so that $W_{c1}$ is greater than $W_{c2}$ ($W_{c1}$ and $W_{c2}$ are the weights (units: % by weight) of c1 and c2 included in the copolymer, respectively) in a mixed weight ratio of (c1) the first cross-linkable monomer and (c2) the second cross-linkable monomer, both of which include at least two unsaturated reactive groups. A synergistic effect of uniform matting characteristics and heat resistance properties may be realized under these conditions.

For example, the first cross-linkable monomer (c1) and the second cross-linkable monomer (c2) may be included at a weight ratio of about 2:1 to about 70:1. When the first cross-linkable monomer (c1) and the second cross-linkable monomer (c2) are included at this weight ratio, a synergistic effect of uniform matting characteristics and heat resistance properties of the copolymer may be realized. By way of another example, (c1) the first cross-linkable monomer and (c2) the second cross-linkable monomer may be included at a weight ratio of about 3:1 to about 50:1. By way of still another example, (c1) the first cross-linkable monomer and (c2) the second cross-linkable monomer may be included at a weight ratio of about 5:1 to about 40:1. By way of yet still another example, (c1) the first cross-linkable monomer and (c2) the second cross-linkable monomer may be included at a weight ratio of about 8:1 to about 20:1.

(c1) First Cross-Linkable Monomer Including at Least Two Unsaturated Reactive Groups The first cross-linkable monomer (c1) including at least two unsaturated reactive groups may be used to realize excellent matting characteristics while maintaining various physical properties such as impact resistance, heat resistance, etc.

The first cross-linkable monomer (c1) including at least two unsaturated reactive groups may include a compound or a mixture of two or more compounds represented by the following Formula 1:

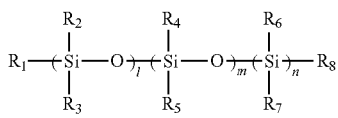

[Formula 1]

In Formula 1, l, m and n are the same or different and are each independently an integer ranging from 0 to 100 (provided that l, m and n are not zero simultaneously), and $R_2$, $R_3$, $R_4$, $R_5$, $R_6$, $R_7$, and $R_8$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, provided that at least two of $R_1$ to $R_8$ include a polymerizable unsaturated reactive group.

The compound may have a linear or ring-shaped structure. When the compound has a ring-shaped structure, adjacent groups of $R_1$ to $R_8$ are optionally linked with each other to form a ring.

In exemplary embodiments, (c1) the first cross-linkable monomer including at least two unsaturated reactive groups may include a compound or a mixture of two or more compounds having a ring-shaped structure represented by the following Formula 2:

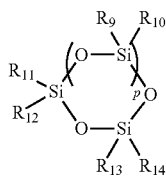

[Formula 2]

In Formula 2, $R_9$, $R_{10}$, $R_{11}$, $R_{12}$, $R_{13}$, and $R_{14}$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, and p is an integer ranging from 1 to 6, provided that at least two of $R_9$ to $R_{14}$ include a polymerizable unsaturated reactive group.

As used herein with reference to the compounds of Formula 1 and/or 2, the term "substituted" means that one or more hydrogen atoms are substituted with one or more substituents, such as but not limited to one or more of a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a $C_1$ to $C_{20}$ alkoxy group, or a combination thereof. As used herein, the term "hetero" refers to a nitrogen, sulfur, oxygen, and/or phosphorus atom in place of a carbon atom.

Examples of the first cross-linkable monomer (c1) including at least two reactive groups that may be used herein may include without limitation 1,3,5-triisopropyl-1,3,5-trivinyl-cyclotrisiloxane, 1,3,5,7-tetraisopropyl-1,3,5,7-tetravinyl-cyclotetrasiloxane, 1,3,5,7,9-pentaisopropyl-1,3,5,7,9-pentavinyl-cyclopentasiloxane, 1,3,5-tri-sec-butyl-1,3,5-trivinyl-cyclotrisiloxane, 1,3,5,7-tetra-sec-butyl-1,3,5,7-tetravinyl-cyclotetrasiloxane, 1,3,5,7,9-penta-sec-butyl-1,3,5,7,9-pentavinyl-cyclopentasiloxane, 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasoxane, 1,3,5-triethyl-1,3,5-trivinyl-cyclotrisiloxane, 1,3,5,7-tetraethyl-1,3,5,7-tetravinyl-cyclotetrasiloxane, and/or 1,3,5,7,9-pentaethyl-1,3,5,7,9-pentavinyl-cyclopentasiloxane. These monomers may be used alone or in combination.

For example, (c1) the first cross-linkable monomer that may be used herein may include 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, and/or 1,3,5,7,9-pentaethyl-1,3,5,7,9-pentavinyl-cyclopentasiloxane. By way of another example, 1,3,5,7-tetramethyl-1,3,5,7-tetravinyl-cyclotetrasiloxane may be used.

The first cross-linkable monomer (c1) including at least two unsaturated reactive groups may be used alone or in combination with other components to realize various excellent physical properties such as impact resistance, heat resistance, and the like as well as matting characteristics which are difficult to achieve using conventional cross-linking agents, and to control a cross-linking degree and a polymerization reaction rate more easily than conventional cross-linking agents.

The first cross-linkable monomer (c1) including at least two unsaturated reactive groups may have a molecular weight or weight average molecular weight of about 150 g/mol to about 6,000 g/mol. When this molecular weight range is satisfied, a cross-linking degree may be easily controlled, and a cross-linking reaction may be smoothly performed to realize excellent matting characteristics.

In exemplary embodiments, (c1) the first cross-linkable monomer including at least two unsaturated reactive groups may be included in an amount of about 0.99 wt % to about 8 wt %, for example about 1.5 wt % to about 7 wt %, and as another example about 2 wt % to about 5 wt %, based on the total weight (100 wt %) of the mixture of monomers used to prepare the aromatic vinyl based copolymer. In some embodiments, the first cross-linkable monomer (c1) including at least two unsaturated reactive groups may be present in an amount of about 0.99, 1, 1.5, 2, 2.5, 3, 3.5, 4, 4.5, 5, 5.5, 6, 6.5, 7, 7.5, or 8 wt %. Further, according to some embodiments, the amount of the first cross-linkable monomer (c1) can be in a range from about any of the foregoing amounts to about any other of the foregoing amounts.

When this content range is satisfied, a cross-linking degree of the aromatic vinyl based copolymer may be easily controlled, matting characteristics may be improved with minimal or no degradation of impact resistance and/or heat resistance, and/or uniform matting characteristics may be generally realized.

(c2) Second Cross-Linkable Monomer Including at Least Two Unsaturated Reactive Groups Examples of the second cross-linkable monomer (c2) including at least two unsaturated reactive groups may include without limitation cross-linkable aromatic monomers such as divinylbenzene, 1,4-divinyloxybutane, vinyl group-containing monomers such as divinylsulfone, allyl compounds, and/or (meth)acrylate compounds. Examples of the allyl compound may include without limitation diallylphthalate, diallylacrylamide, triallyl(iso)cyanurate, and/or triallyltrimellitate. Examples of the (meth)acrylate compound may include without limitation hexanediol diacrylate, ethylene glycol dimethacrylate, diethylene glycol methacrylate, triethylene glycol dimethacrylate, trimethylene propane trimethacrylate, 1,3-butanediol methacrylate, 1,6-hexanediol dimethacrylate, pentaerythritol tetra(meth)acrylate, pentaerythritol tri(meth)acrylate, pentaerythritol di(meth)acrylate, trimethylolpropane, tri(meth)acrylate, dipentaerythritol hexa(meth)acrylate, dipentaerythritol penta(meth)acrylate, glycerol tri(meth)acrylate, and/or allyl(meth)acrylate.

The second cross-linkable monomer (c2) including at least two unsaturated reactive groups may be included in an amount of about 0.01 wt % to about 2 wt %, for example about 0.01 wt % to about 1 wt %, based on the total weight (100 wt %) of the mixture of monomers used to prepare the aromatic vinyl based copolymer. In some embodiments, the second cross-linkable monomer (c2) including at least two unsaturated reactive groups may be present in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, or 2 wt %. Further, according to some embodiments, the amount of the second cross-linkable monomer (c2) can be in a range from about any of the foregoing amounts to about any other of the foregoing amounts. The component may be used to easily adjust a cross-linking degree of the copolymer, improve thermo-matting characteristics with minimal or no degradation of impact resistance and/or heat resistance, and/or generally realize uniform matting characteristics.

In exemplary embodiments, the copolymer may be a styrenic copolymer. Also in exemplary embodiments, the copolymer may be linear or cross-linked. For example, the copolymer may be cross-linked. In this case, the cross-linking of the copolymer may be confirmed from a quantity of an insoluble content measured a Soxhlet extraction method.

The Soxhlet extraction may be performed using a conventional organic solvent. For example, toluene, tetrahydrofuran, ethylacetate, and/or chloroform may be used as the organic solvent. These organic solvents may be used alone or in combination, but the present invention is not particularly limited thereto. For example, tetrahydrofuran (THF) may be used.

The Soxhlet extraction may be performed in a Soxhlet extraction reactor using a mixed solution obtained by mixing the copolymer according to one embodiment of the present invention with a solvent. FIG. 1 is a schematic view of a Soxhlet extraction reactor according to one embodiment of the present invention. Upon extraction, tetrahydrofuran 12 contained in a container 11 is heated and evaporated using a heater 13. The evaporated tetrahydrofuran is passed through an evaporation line 14, and supplied into a cooler 15 (including a cooling water inlet port 16 and a cooling water outlet port 17). The tetrahydrofuran cooled in the cooler is liquefied, and stored in a storage member included in a cylindrical filter 18. Thereafter, when the tetrahydrofuran is present at an excessive amount such that the tetrahydrofuran is emitted from the storage member through a circulation line 19 and flows in a container 11 through the circulation line 19, a resin is extracted into the circulating tetrahydrofuran through the cylindrical filter.

In exemplary embodiments, the copolymer can be subjected to Soxhlet extraction for 48 hours using tetrahydrofuran (THF). In this case, the insoluble content remaining after the extraction may be in a range of about 5 wt % to about 100 wt %.

Also, the copolymer according to exemplary embodiments may have a silicon content of about 0.33 wt % to about 2.61 wt %, as measured by an X-ray fluorescence (XRF) spectrometer.

In this case, the XRF analysis is fluorescent X-ray spectrometry, that is, a method in which X rays collide with a substance to analyze the wavelength distribution of X rays secondarily emitted from the substance so as to estimate types and composition ratios of component elements in the substance. A conventional apparatus may be used in this analysis. In the present invention, an X-ray fluorescence spectrometer (Model: Axios advanced. Maker. Panalytical (Netherland) was used.

By way of example, a specimen using the aromatic vinyl based copolymer according to one embodiment is manufactured in a method for analysis of silicon using XRF. Also, an analytical reference specimen is prepared. Silicon (Si) elements included in the reference specimen are measured using X-ray fluorescence (XRF) spectrometry, and a calibration curve of the silicon (Si) elements is plotted. Next, the silicon (Si) elements in the specimen may be measured using X-ray fluorescence (XRF) spectrometry, and then subjected to quantitative analysis by applying the silicon (Si) elements to the previously plotted calibration curve.

The copolymer according to exemplary embodiments may have a glass transition temperature ($T_g$) of about 95° C. to about 115° C. Within this temperature range, a thermoplastic resin composition including the aromatic vinyl based copolymer may exhibit excellent matting characteristics with minimal or no degradation of impact resistance and/or heat resistance.

The copolymer may be prepared using a conventional polymerization method such as suspension polymerization, emulsion polymerization, solution polymerization, etc., but the present invention is not particularly limited thereto. Suspension polymerization may be used to prepare the copolymer. When the aromatic vinyl based copolymer is prepared using a suspension polymerization method, an inorganic dispersing agent and/or an organic dispersing agent may be used to improve dispersibility. A homopolymer and/or a copolymer of acrylic acid and/or methacrylic acid may be used as the organic dispersing agent. When the copolymer is used as the organic dispersing agent, the content of the acrylic acid and/or methacrylic acid used may be greater than or equal to about 50 parts by weight, based on about 100 parts by weight of the copolymer. Also, the acrylic acid and/or methacrylic acid may be in the form of a salt of sodium, potassium and/or ammonium so as to maintain proper solubility.

In exemplary embodiments, azobisisobutyronitrile may be used as a polymerization initiator, but the present invention is not particularly limited thereto. The polymerization initiator may be used in an amount of about 0.01 to about 10 parts by weight, based on about 100 parts by weight of the mixture of monomers used to prepare the copolymer.

The copolymer may be used to realize matting characteristics of a thermoplastic resin composition. Thus, exemplary embodiments also include a thermoplastic resin composition including the copolymer described herein and one or more thermoplastic resins.

Examples of the thermoplastic resin composition may include without limitation a styrene-acrylonitrile copolymer (SAN) resin composition, a methyl methacrylate-styrene-acrylonitrile copolymer (MSAN) resin composition, an acrylonitrile-butadiene-styrene copolymer (ABS) resin composition, a methyl methacrylate-acrylonitrile-butadiene-styrene copolymer (MABS) resin composition, an acrylonitrile-styrene-acrylate copolymer (ASA) resin composition, a polycarbonate (PC)/acrylonitrile-butadiene-styrene copolymer (ABS) alloy resin composition, a polycarbonate (PC)/acrylonitrile-styrene-acrylate copolymer (ASA) alloy resin composition, a polymethyl methacrylate (PMMA)/acrylonitrile-butadiene-styrene copolymer (ABS) alloy resin composition, a polymethyl methacrylate (PMMA)/methyl methacrylate-acrylonitrile-butadiene-styrene copolymer (MABS) alloy resin composition, and/or a polymethyl methacrylate (PMMA)/acrylonitrile-styrene-acrylate copolymer (ASA) alloy resin composition. These resin compositions may be used alone or in combination. In some embodiments, the resin compositions may be used in an amount of about 40 wt % to about 95 wt %, based on the total weight (100 wt %) of the thermoplastic resin composition.

The thermoplastic resin composition including the copolymer may exhibit excellent matting characteristics with minimal or no degradation of physical properties such as impact resistance, heat resistance, etc.

The present invention may provide a molded article including the thermoplastic resin composition including the copolymer. For example, the thermoplastic resin composition including the copolymer may be applied to various industry fields such as various electric and electronic products, automobile parts, and the like to provide a molded article.

The molded article according to one embodiment of the present invention may have a gloss of about 50% or less, as measured at an angle of 60° by an evaluation method according to ASTM D523, and may have a Vicat softening temperature (VST) of about 101° C. to about 110° C., as measured for a ¼ inch-thick specimen under conditions of a load of 5 kg and a rate of 50° C./hr by an evaluation method according to ISO 306B50.

Hereinafter, exemplary embodiments of the present invention will be described in further detail with reference to the following examples. It should be understood that these examples are provided for illustration only and are not to be construed in any way as limiting the present invention.

EXAMPLES AND COMPARATIVE EXAMPLES

Specifications of the respective components used in Examples and Comparative Examples are as follows.

(A) Styrene is used as an aromatic vinyl-based monomer.

(B) Acrylonitrile is used as an unsaturated nitrile-based monomer.

(c1) 1,3,5,7-tetramethyl-1,3,5,7-tetravinyl-cyclotetrasiloxane (SKC Co., Ltd.; density: about 0.98 g/ml (20° C.), article name: Vinyl D-4, and molecular weight: 344.7 g/mol) is used as a first cross-linkable monomer including at least two unsaturated reactive groups.

(c2) Divinylbenzene (Fluka Chemie AG.; article name: DVB, and molecular weight: 130.2 g/mol) is used as a second cross-linkable monomer including at least two unsaturated reactive groups.

Example 1

0.2 parts by weight of t-dodecyl mercaptan (TDM), and 0.2 parts by weight of azobisisobutyronitrile (AIBN) are put into a reactor, based on the weight of a mixture of monomers including the components and contents thereof as listed in the following Table 1, and subjected to suspension polymerization to prepare a copolymer. The copolymer is washed with water, dehydrated, and then dried at 80° C. for 48 hours. Thereafter, the copolymer is extruded at a barrel temperature of about 250° C. using a twin-screw extruder equipped with a T-die to prepare a specimen for evaluating physical properties in the form of a sheet having a thickness of about 1 mm. The prepared copolymer has a weight average molecular weight of 160,000 g/mol, and a glass transition temperature of 104.4° C.

Example 2

A copolymer is prepared in the same manner as in Example 1, except that the components and contents thereof as listed in the following Table 1 are used. The prepared copolymer has a weight average molecular weight of 150,000 g/mol, and a glass transition temperature of 102.1° C.

Example 3

A copolymer is prepared in the same manner as in Example 1, except that the components and contents thereof as listed in the following Table 1 are used. The prepared copolymer has a weight average molecular weight of 150,000 g/mol, and a glass transition temperature of 101.8° C.

Comparative Example 1

A copolymer is prepared in the same manner as in Example 1, except that the components and contents thereof as listed in the following Table 1 are used. The prepared copolymer has a weight average molecular weight of 180,000 g/mol, and a glass transition temperature of 101.3° C.

Comparative Example 2

A copolymer is prepared in the same manner as in Example 1, except that the components and contents thereof as listed in the following Table 1 are used. The prepared copolymer has a weight average molecular weight of 395,000 g/mol, and a glass transition temperature of 105.9° C.

TABLE 1

| Units: wt % | | Example 1 | Example 2 | Example 3 | Comparative Example 1 | Comparative Example 2 |
|---|---|---|---|---|---|---|
| (A) | | 74.4 | 74.0 | 75.96 | 74.5 | 75.0 |
| (B) | | 23.5 | 23.5 | 22.0 | 23.5 | 24.0 |
| (C) | (c1) | 2.0 | 2.0 | 2.0 | 2.0 | — |
| | (c2) | 0.1 | 0.5 | 0.04 | — | 1.0 |
| Glass transition temperature ($T_g$; ° C.) | | 104.4 | 102.1 | 101.8 | 101.3 | 105.9 |

The glass transition temperatures ($T_g$) of the copolymers prepared in Examples 1 to 3 and Comparative Examples 1 and 2 are measured as follows: the copolymers are first heated to a temperature of 160° C. at a rate of 20° C./min using Q2910 commercially available from TA Instruments Co. Ltd., slowly cooled to maintain an equilibrium state at 50° C., and heated to a temperature of 160° C. at a rate of 10° C./min. Then, an inflection point in the endothermic transition curve is determined as the glass transition temperature.

Example 4

0.1 parts by weight of a hindered phenol-based thermal stabilizer (BASF, article name: IRGANOX 1010) is added based on 100 parts by weight of a base resin, which includes 10 wt % of the copolymer prepared in Example 1, 70 wt % of a styrene-acrylonitrile copolymer (a copolymer with a weight average molecular weight of 100,000 g/mol prepared by subjecting 76 wt % of styrene and 24 wt % of acrylonitrile to a conventional suspension polymerization method), and 20 wt % of an acrylonitrile-butadiene-styrene graft copolymer (g-ABS) having a core-shell structure which includes a rubbery polymer at a content of 58 wt % and has an average particle size of 300 nm. Thereafter, the resulting mixture is melted, kneaded, and extruded to prepare a pellet.

In this case, the extrusion is performed at a barrel temperature of about 250° C. using a twin-screw extruder having a L/D ratio of 29 and a diameter of 45 mm, and the prepared pellet is dried at about 80° C. for about 2 hours, and then injection-molded at a cylinder temperature of about 230° C. in a 6 oz injection molding machine to prepare a specimen for evaluating physical properties. The Izod impact strength, Vicat softening temperature and gloss of the prepared specimen are measured. The measured results are listed in the following Table 2.

Example 5

A specimen is prepared in the same manner as in Example 4, except that a mixture including the copolymer of Example 1 at 20 wt %, the styrene-acrylonitrile copolymer (a copolymer with a weight average molecular weight of 100,000 g/mol prepared by subjecting 76 wt % of styrene and 24 wt % of acrylonitrile to a conventional suspension polymerization method) at 60 wt %, and the acrylonitrile-butadiene-styrene graft copolymer (g-ABS) having a core-shell structure which includes a rubbery polymer at a content of 58 wt % and has an average particle size of 300 nm at 20 wt % is used as the base resin.

Example 6

A specimen is prepared in the same manner as in Example 4, except that a mixture including the copolymer of Example 1 at 30 wt %, the styrene-acrylonitrile copolymer (a copolymer with a weight average molecular weight of 100,000 g/mol prepared by subjecting 76 wt % of styrene and 24 wt % of acrylonitrile to a conventional suspension polymerization method) at 50 wt %, and the acrylonitrile-butadiene-styrene graft copolymer (g-ABS) having a core-shell structure which includes a rubbery polymer at a content of 58 wt % and has an average particle size of 300 nm at 20 wt % is used as the base resin.

Example 7

A specimen is prepared in the same manner as in Example 4, except that the styrenic copolymer prepared in Example 2 is used instead of the copolymer of Example 1.

Example 8

A specimen is prepared in the same manner as in Example 4, except that the styrenic copolymer prepared in Example 3 is used instead of the copolymer of Example 1.

Comparative Example 3

A specimen is prepared in the same manner as in Example 6, except that the styrenic copolymer prepared in Comparative Example 1 is used instead of the copolymer of Example 1.

Comparative Example 4

A specimen is prepared in the same manner as in Example 6, except that the styrenic copolymer prepared in Comparative Example 2 is used instead of the copolymer of Example 1.

Comparative Example 5

A specimen is prepared in the same manner as in Example 4, except that a mixture including Blendex BMAT (commercially available from GE Specialty Chemicals Inc.) at 5 wt %, the styrene-acrylonitrile copolymer (a copolymer with a weight average molecular weight of 100,000 g/mol prepared by subjecting 76 wt % of styrene and 24 wt % of acrylonitrile to a conventional suspension polymerization method) at 76 wt %, and the acrylonitrile-butadiene-styrene graft copolymer (g-ABS) having a core-shell structure which includes a rubbery polymer at a content of 58 wt % and has an average particle size of 300 nm at 19 wt % is used as the base resin.

The glass transition temperatures, gloss, Vicat softening temperatures, and Izod impact strengths of the specimens prepared in Examples 4 to 8 and Comparative Examples 3 to 5 are measured, as follows. The measured results are listed in the following Table 2.

(1) Surface Gloss (Units: %)

The surface gloss is measured at an angle of 60° by an evaluation method according to ASTM D523 using a BYK-Gardner gloss meter commercially available from BYK.

(2) Vicat Softening Temperature (VST) (Units: ° C.)

The Vicat softening temperature of a ¼ inch-thick specimen is measured under conditions of a load of 5 kg and a rate of 50° C./hr by an evaluation method according to ISO 306B50.

(3) Izod Impact Strength (Units: kgf·cm/cm)

The Izod impact strength of a ⅛ inch-thick specimen is measured under notched conditions by an evaluation method according to ASTM D256.

TABLE 2

| Item | Vicat softening temperature (° C.) | Gloss (%) | Izod impact strength (kgf · cm/cm) |
| --- | --- | --- | --- |
| Example 4 | 101.1 | 49 | 11.6 |
| Example 5 | 101.2 | 38 | 11.3 |
| Example 6 | 101.4 | 31 | 11.0 |
| Example 7 | 100.8 | 32 | 10.8 |
| Example 8 | 100.7 | 32 | 10.9 |
| Comparative Example 3 | 100.4 | 35 | 16.8 |
| Comparative Example 4 | 101.4 | 90 | 19.1 |
| Comparative Example 5 | 99.5 | 39 | 11.0 |

As listed in Table 2, the specimens of Examples 4 to 6 which include the copolymer prepared in Example 1 exhibit matting characteristics without degrading impact resistance strength, and also have improved heat resistance properties while maintaining a Vicat softening temperature of greater than 100.7° C. The specimens of Examples 7 and 8, which include the copolymers prepared in Examples 2 and 3, respectively, have a different mixed weight ratio of 1,3,5,7-tetramethyl-1,3,5,7-tetravinyl-cyclotetrasiloxane and N-phenyl maleimide when the two compounds including at least two unsaturated reactive groups are used, and have slightly lower heat resistance properties than the specimens of Examples 4 to 6, but are able to maintain matting characteristics, and physical properties such as impact resistance. In contrast, the specimens of Comparative Examples 3 to 5 have degraded heat resistance properties when the specimens exhibit matting characteristics, or have degraded matting characteristics when the specimens exhibit heat resistance properties.

Although the present invention has been described in detail with reference to embodiments thereof, the embodiments of the present invention are provided to aid in understanding the present invention and not intended to limit the scope of the present invention. Therefore, it will be appreciated by those skilled in the art that various changes and modifications may be made in these embodiments without departing from the scope of the invention. The scope of the prevent invention is defined not by the detailed description, but by the claims and their equivalents, and all variations within the scope of the claims and their equivalents are to be construed as being included in the scope of the prevent invention.

What is claimed is:

1. A copolymer of a mixture of monomers, comprising:
(A) about 50 wt % to about 80 wt % of an aromatic vinyl-based monomer;
(B) about 15 wt % to about 40 wt % of an unsaturated nitrile-based monomer; and
(C) about 1 wt % to about 10 wt % of a cross-linkable monomer, each based on the total weight of the mixture of monomers to be copolymerized;
wherein (C) the cross-linkable monomer comprises (c1) a first cross-linkable monomer including at least two unsaturated reactive groups, and (c2) a second cross-linkable monomer including at least two unsaturated reactive groups which is not the same as (c1) the first cross-linkable monomer including at least two unsaturated reactive groups,
wherein (c1) the first cross-linkable monomer includes a siloxane bond, and (c2) the second cross-linkable monomer includes no siloxane bonds.

2. The copolymer of claim 1, comprising the first cross-linkable monomer (c1) in an amount of about 0.99 wt % to about 8 wt %, based on the total weight of a mixture of monomers to be copolymerized, and comprising the second cross-linkable monomer (c2) in an amount of about 0.01 wt % to about 2 wt %, based on the total weight of a mixture of monomers to be copolymerized.

3. The copolymer of claim 1, comprising (c1) the first cross-linkable monomer and (c2) the second cross-linkable monomer in a weight ratio of about 2:1 to about 70:1.

4. The copolymer of claim 1, wherein the first cross-linkable monomer (c1) has a structure represented by the following Formula 1:

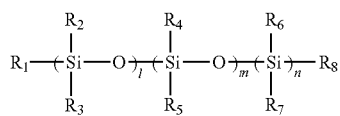

[Formula 1]

wherein l, m and n are the same or different and each is independently an integer ranging from 0 to 100, provided that they are not zero simultaneously, and $R_1, R_2, R_3, R_4, R_5, R_6, R_7$, and $R_8$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, provided that at least two of $R_1$ to $R_8$ include a polymerizable unsaturated reactive group.

5. The copolymer of claim 1, wherein the first cross-linkable monomer (c1) has a structure represented by the following Formula 2:

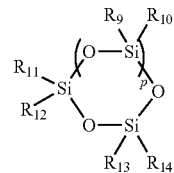

[Formula 2]

wherein $R_9$ to $R_{14}$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, and p is an integer ranging from 1 to 6, provided that at least two of $R_9$ to $R_{14}$ include a polymerizable unsaturated reactive group.

6. The copolymer of claim 1, wherein the first cross-linkable monomer (c1) comprises 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, and/or 1,3,5,7,9-pentaethyl-1,3,5,7,9-pentavinyl-cyclopentasiloxane.

7. The copolymer of claim 1, wherein the first cross-linkable monomer (c1) has a weight average molecular weight of about 150 g/mol to about 6,000 g/mol.

8. The copolymer of claim 1, wherein the second cross-linkable monomer (c2) comprises: a cross-linkable aromatic monomer comprising divinylbenzene; a vinyl group-containing monomer comprising 1,4-divinyloxybutane and/or divinylsulfone; an allyl compound comprising diallylphthalate, diallylacrylamide, triallyl(iso)cyanurate, and/or triallyltrimellitate; and/or a (meth)acrylate compound comprising hexanediol diacrylate, ethylene glycol dimethacrylate, diethylene glycol methacrylate, triethylene glycol dimethacrylate, trimethylene propane trimethacrylate, 1,3-butanediol methacrylate, 1,6-hexanediol dimethacrylate, pentaerythritol tetra(meth)acrylate, pentaerythritol tri(meth)acrylate, pentaerythritol di(meth)acrylate, trimethylolpropane, tri(meth)acrylate, dipentaerythritol hexa(meth)acrylate, dipentaerythritol penta(meth)acrylate, glycerol tri(meth)acrylate, and/or allyl(meth)acrylate.

9. The copolymer of claim 1, wherein the aromatic vinyl-based monomer (A) comprises styrene, α-methylstyrene, β-methylstyrene, p-methylstyrene, p-t-butylstyrene, ethylstyrene, vinylxylene, monochlorostyrene, dichlorostyrene, dibromostyrene, and/or vinylnaphthalene.

10. The copolymer of claim 1, wherein the unsaturated nitrile-based monomer (B) comprises acrylonitrile, methacrylonitrile, ethacrylonitrile, phenylacrylonitrile, α-chloroacrylonitrile, and/or fumaronitrile.

11. The copolymer of claim 1, wherein the copolymer has an insoluble content of about 5 wt % to about 100 wt %, as measured by a Soxhlet extraction method using tetrahydrofuran (THF) for 48 hours.

12. The copolymer of claim 1, wherein the copolymer has a silicon content of about 0.33 wt % to about 2.61 wt %, as measured by an X-ray fluorescence spectrometer.

13. The copolymer of claim 1, wherein the copolymer has a glass transition temperature ($T_g$) of about 95° C. to about 115° C.

14. A thermoplastic resin composition comprising the copolymer according to claim 1.

15. The thermoplastic resin composition of claim 14, wherein the thermoplastic resin composition comprises a styrene-acrylonitrile copolymer (SAN) resin composition, a methyl methacrylate-styrene-acrylonitrile copolymer (MSAN) resin composition, an acrylonitrile-butadiene-styrene copolymer (ABS) resin composition, a methyl methacrylate-acrylonitrile-butadiene-styrene copolymer (MABS) resin composition, an acrylonitrile-styrene-acrylate copolymer (ASA) resin composition, a polycarbonate (PC)/acrylonitrile-butadiene-styrene copolymer (ABS) alloy resin composition, a polycarbonate (PC)/acrylonitrile-styrene-acrylate copolymer (ASA) alloy resin composition, a polymethyl methacrylate (PMMA)/acrylonitrile-butadiene-styrene copolymer (ABS) alloy resin composition, a polymethyl methacrylate (PMMA)/methyl methacrylate-acrylonitrile-butadiene-styrene copolymer (MABS) alloy resin composition, and/or a polymethyl methacrylate (PMMA)/acrylonitrile-styrene-acrylate copolymer (ASA) alloy resin composition.

16. A molded article comprising the thermoplastic resin composition according to claim 14.

17. The molded article of claim 16, wherein the molded article has a gloss of about 50% or less, as measured at an angle of 60° by an evaluation method according to ASTM D523, and has a Vicat softening temperature (VST) of about 101° C. to about 110° C., as measured for a ¼ inch-thick specimen under conditions of a load of 5 kg and a rate of 50° C./hr by an evaluation method according to ISO 306B50.

* * * * *

UNITED STATES PATENT AND TRADEMARK OFFICE
CERTIFICATE OF CORRECTION

PATENT NO. : 9,850,333 B2
APPLICATION NO. : 14/749861
DATED : December 26, 2017
INVENTOR(S) : Joo Hyun Jang et al.

Page 1 of 1

It is certified that error appears in the above-identified patent and that said Letters Patent is hereby corrected as shown below:

In the Specification

Column 7, delete Line 11 and insert:
--vided that l, m and n are not zero simultaneously), $R_1$ and $R_2$,--

Signed and Sealed this
First Day of May, 2018

Andrei Iancu
*Director of the United States Patent and Trademark Office*